(12) United States Patent
James

(10) Patent No.: US 10,061,789 B2
(45) Date of Patent: Aug. 28, 2018

(54) DYNAMIC DATABASE INDEXES FOR ENTITY ATTRIBUTE VALUE STORES

(71) Applicant: Excalibur IP, LLC, New York, NY (US)

(72) Inventor: Rick James, Los Altos, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 106 days.

(21) Appl. No.: 14/064,707

(22) Filed: Oct. 28, 2013

(65) Prior Publication Data

US 2015/0120745 A1    Apr. 30, 2015

(51) Int. Cl.
*G06F 17/30*    (2006.01)

(52) U.S. Cl.
CPC .. *G06F 17/30306* (2013.01); *G06F 17/30315* (2013.01)

(58) Field of Classification Search
CPC ................................................ G06F 17/30315
See application file for complete search history.

(56) References Cited

U.S. PATENT DOCUMENTS

| | | | | |
|---|---|---|---|---|
| 2005/0050076 A1* | 3/2005 | Tong | ............... | G06F 17/30297 |
| 2005/0187977 A1* | 8/2005 | Frost | ............... | G06F 17/30584 |
| 2007/0288495 A1* | 12/2007 | Narasayya | ........ | G06F 17/30306 |
| 2007/0294276 A1* | 12/2007 | Shen | ............... | G06F 17/30952 |
| 2008/0040348 A1* | 2/2008 | Lawande | .......... | G06F 17/30312 |
| 2009/0089313 A1* | 4/2009 | Cooper | ............. | G06F 17/30306 |
| 2013/0041887 A1* | 2/2013 | Egan | ................. | G06F 17/30312 707/718 |
| 2013/0275367 A1* | 10/2013 | Shuma | ............. | G06F 17/30595 707/609 |

* cited by examiner

*Primary Examiner* — Mark E Hershley
*Assistant Examiner* — Huen Wong
(74) *Attorney, Agent, or Firm* — Brinks Gilson & Lione

(57) ABSTRACT

A system and method for database storage may be dynamically optimized for entity-attribute-value (EAV) data. In one embodiment, this dynamic EAV database may include one column for the entity identification ("ID") and a second column for the serialized data for that ID (each attribute and the values for those attributes). The database may be dynamically updated to move or copy certain attributes to a separate column. The dynamic updating of one or more attributes may be based on certain factors (seasonal, temporal, usage, etc.), such as frequent requests for a particular attribute. This dynamic updating and indexing of particular attributes may improve certain queries and data requests.

16 Claims, 4 Drawing Sheets

| ID | Serialized Data |
|---|---|
| 1 | Color=Blue; Size=2; Shape=Round; Type=A |
| 2 | Color=Red; Size=5; Shape=Square |
| 3 | Color=Green; Size=4 |
| 4 | Type=X |

| ID | Serialized | Color |
|---|---|---|
| 1 | Size=2; Shape=Round; Type=A | Blue |
| 2 | Size=5; Shape=Square | Red |
| 3 | Size=4 | Green |
| 4 | Type=X | |

| ID | Serialized | Color | Shape |
|---|---|---|---|
| 1 | Size=2; Type=A | Blue | Round |
| 2 | Size=5 | Red | Square |
| 3 | Size=4 | Green | |
| 4 | Type=X | | |

| ID | Serialized | Color | Shape | Size |
|---|---|---|---|---|
| 1 | Type=A | Blue | Round | 2 |
| 2 | | Red | Square | 5 |
| 3 | | Green | | 4 |
| 4 | Type=X | | | |

Figure 2

| ID | Color | Size | Shape | Type |
|----|-------|------|-------|------|
| 1  | Blue  | 2    | Round | A    |
| 2  | Red   | 5    | Square|      |
| 3  | Green | 4    |       |      |
| 4  |       |      |       | X    |

Figure 3

| ID | Attribute | Value  |
|----|-----------|--------|
| 1  | Color     | Blue   |
| 1  | Size      | 2      |
| 1  | Shape     | Round  |
| 1  | Type      | A      |
| 2  | Color     | Red    |
| 2  | Size      | 5      |
| 2  | Shape     | Square |
| 3  | Color     | Green  |
| 3  | Size      | 4      |
| 4  | Type      | X      |

Figure 4

| ID | Serialized Data |
|---|---|
| 1 | Color=Blue; Size=2; Shape=Round; Type=A |
| 2 | Color=Red; Size=5; Shape=Square |
| 3 | Color=Green; Size=4 |
| 4 | Type=X |

| ID | Serialized | Shape |
|---|---|---|
| 1 | Color=Blue; Size=2; Type=A | Round |
| 2 | Color=Red; Size=5 | Square |
| 3 | Color=Green; Size=4 | |
| 4 | Type=X | |

Figure 5

| ID | Serialized Data |
|---|---|
| 1 | Color=Blue; Size=2; Shape=Round; Type=A |
| 2 | Color=Red; Size=5; Shape=Square |
| 3 | Color=Green; Size=4 |
| 4 | Type=X |

| ID | Serialized | Type |
|---|---|---|
| 1 | Color=Blue; Size=2; Shape=Round; Type=A | A |
| 2 | Color=Red; Size=5; Shape=Square | |
| 3 | Color=Green; Size=4 | |
| 4 | Type=X | X |

Figure 6

| ID | Serialized Data |
|---|---|
| 1 | Color=Blue; Size=2; Shape=Round; Type=A |
| 2 | Color=Red; Size=5; Shape=Square |
| 3 | Color=Green; Size=4 |
| 4 | Type=X |

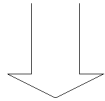

| ID | Serialized | Color |
|---|---|---|
| 1 | Size=2; Shape=Round; Type=A | Blue |
| 2 | Size=5; Shape=Square | Red |
| 3 | Size=4 | Green |
| 4 | Type=X | |

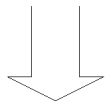

| ID | Serialized | Color | Shape |
|---|---|---|---|
| 1 | Size=2; Type=A | Blue | Round |
| 2 | Size=5 | Red | Square |
| 3 | Size=4 | Green | |
| 4 | Type=X | | |

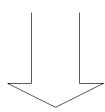

| ID | Serialized | Color | Shape | Size |
|---|---|---|---|---|
| 1 | Type=A | Blue | Round | 2 |
| 2 | | Red | Square | 5 |
| 3 | | Green | | 4 |
| 4 | Type=X | | | |

DYNAMIC DATABASE INDEXES FOR ENTITY ATTRIBUTE VALUE STORES

BACKGROUND

Databases may be used to store data. The data may include may include entity-attribute-value ("EAV") data. EAV may describe entities with different attributes and the respective values for each of those attributes. For example, in a shopping context, an entity may be a particular product (e.g. pants) with attributes (e.g. size, color, fit, style, etc.) and values for each of those attributes (e.g. 32" waist, navy, boot-cut, trim fit). EAV may also be referred to as an object-attribute-value model or a vertical database model. The attributes may be referred to as parameters, components, factors, or properties. In some embodiments, EAV may be an optimal way to structure data. However, depending on the amount of data, the number of attributes, and types of requests for the data, EAV data may be difficult to search and access. A large EAV database or one with many attributes may requires significant processing that may result in performance degradation of both managing the EAV database and merely accessing data from the database.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIG. 2 is a diagram of a sparse matrix organization of EAV data;

FIG. 3 is a diagram of direct translation of EAV data;

FIG. 4 is a diagram of one embodiment for dynamically indexing attributes;

FIG. 5 is a diagram of another embodiment for dynamically indexing attributes; and FIG. 6 is a diagram of dynamically indexing different attributes.

DETAILED DESCRIPTION

Figure 1:
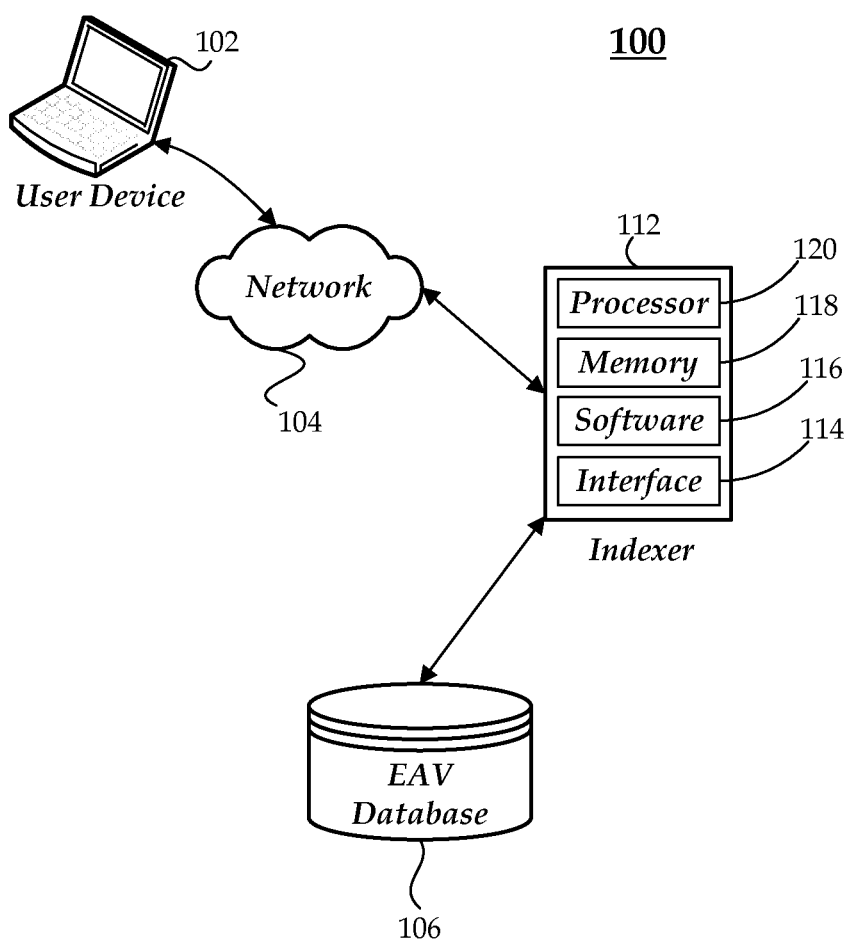
FIG. 1 is a diagram of an exemplary network system.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

By way of introduction, database structure may be modified to optimize the management and accessing of the database for entity-attribute-value ("EAV") data. For example, EAV data may be stored such that attributes and values are serialized. Based on certain factors (seasonal, temporal, usage, etc.), one or more attributes may be dynamically indexed. For example, frequent requests for a particular attribute may result in that attribute being separated from the other serialized attributes. In one embodiment, this dynamic EAV database may include one column for the entity identification ("ID") and a second column for the serialized data for that ID (each attribute and the values for those attributes). The database may be dynamically updated to move or copy certain attributes to a separate column. This dynamic updating and indexing of particular attributes may improve certain queries and data requests.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

FIG. 1 depicts a block diagram illustrating one embodiment of an exemplary network system 100. The network system 100 may provide a platform for indexing a database and accessing data from that database. In the network system 100, a user device 102 is coupled through a network 104 with an indexer 112 and/or an EAV database 106. Herein, the phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided. Accordingly, the indexer 112 may be coupled directly or through a network (e.g. the network 104) with the EAV database 106. In alternative embodiments, the indexer 112 may be a part of the EAV database 106. Likewise, the indexer 112 may be part of the user device 102.

The user device 102 may be a computing device which allows a user to connect to a network 104, such as the Internet. The user device 102 may provide an interface for modifying/indexing/accessing the EAV database 106. In addition, the user device 102 may provide an interface for accessing/controlling the indexer 112. The user device 102 may also be referred to as a client device and may include a computing device capable of sending or receiving signals, such as via a wired or a wireless network (e.g. the network 104, which may be the Internet). The user device 102 may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. The user device 102 may include or may execute a variety of operating systems, including a personal computer operating system, such as a Windows, iOS or Linux, or a mobile operating system, such as iOS, Android, or Windows Mobile, or the like. The user device 102 may include or may execute a variety of possible applications, such as database management programs that may manage the EAV database 106 with or without the indexer 112. In one embodiment, the user device 102 is configured to request and receive information from a network (e.g. the network 104, which may be the Internet). The information may include dynamic indexing instructions for the EAV database 106 and/or query requests to the EAV database 106.

The EAV database 106 may be coupled with the indexer 112 and/or the user device 102 or other devices. The EAV database 106 may be any device that stores data, such as a memory. For example, a computing device with a memory may be a database that stores data. In one embodiment, the data stored may be according to the EAV model. Data delivered over a network such as the Internet may be stored in an EAV format. The EAV format may include a unique identifier for each entity of data, each of which may have a variety of associated attributes. Each of these attributes, in turn, may take on a set of values, which may be integers, floating point variables, characters, strings, or other variable types. An optimal data structure according to one embodiment for the EAV data is discussed below with respect to FIGS. 4-5 and the dynamic updating of the data structure for the EAV data is discussed below with respect to FIG. 6.

EAV data may alternatively be called key-value data where the attribute is the key. Other alternatives to EAV data for which the optimal data structure may also apply include Resource Description Framework ("RDF"), MariaDB, MongoDB, CouchDB, and other database structures (both SQL and non-SQL based).

Although not shown, the indexer 112 may include or act as a server. Likewise, the EAV database 106 may be coupled with a server for communicating with other devices (e.g. the user device 102). The server may be a computing device which may be capable of sending or receiving signals, such as via a wired or wireless network, or may be capable of processing or storing signals, such as in memory as physical memory states. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

The indexer 112 may dynamically update the data model of the EAV data stored in the EAV database 106. In particular, the indexer 112 may dynamically update certain attributes such that those attributes are stored as their own column rather than in a serialized data column for the other attributes (and respective values for those attributes). This dynamic updating of the EAV data/database provides for indexing of certain attributes that can be queried more quickly and efficiently. Data stored in the serialized format may have a slower response time for queries for values of particular attributes.

In one embodiment, the indexer 112 may be part of the EAV database 106 or may be part of the user device 102. Alternatively, the indexer 112 may be part of a separate entity. The indexer 112 may perform the dynamic updating of the data as shown in FIGS. 4-6. The indexer 112 may be a computing device for generating/organizing tables (e.g. EAV data in multiple columns) for the database and optimizing management and accessing of those tables.

The indexer 112 may include a processor 120, memory 118, software 116 and an interface 114. The interface 114 may communicate with the user device 102 and/or the EAV database 106. The interface 114 may include a user interface configured to allow a user and/or administrator to interact with any of the components of the indexer 112. In one embodiment, the user device 102 may act as the interface for the EAV database 106.

The processor 120 in the indexer 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program, such as code generated manually (i.e., programmed).

The processor 120 may be coupled with a memory 118, or the memory 118 may be a separate component. The interface 114 and/or the software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store ad or user data. The memory 118 is operable to store instructions executable by the processor 120. In one embodiment, the memory 118 may be the EAV database 106 although FIG. 1 illustrates the EAV database 106 as a separate entity in another embodiment.

The functions, acts or tasks illustrated in the figures or described herein may be performed by the programmed processor executing the instructions stored in the memory 118. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like. The processor 120 is configured to execute the software 116. The software 116 may include instructions for dynamically managing and/or indexing data in the EAV database 106.

The interface 114 may be a user input device for accessing/managing the EAV database 106. The interface 114 may include a keyboard, keypad or a cursor control device, such as a mouse, or a joystick, touch screen display, remote control or any other device operative to interact with the indexer 112. The interface 114 may include a display coupled with the processor 120 and configured to display an output from the processor 120. The display may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for the EAV database 106.

The present disclosure contemplates a computer-readable medium that includes instructions or receives and executes instructions responsive to a propagated signal, so that a device connected to a network can communicate voice, video, audio, images or any other data over a network. The interface 114 may be used to provide the instructions over the network via a communication port. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly as discussed below. Likewise, the connections with other components of the system 100 may be physical connections or may be established wirelessly. Any of the components in the network system 100 may be coupled with one another through a network, including but not limited to the network 104. For example, the indexer 112 may be coupled with the EAV database 106 and/or the user device 102 through a network. Accordingly, any of the components in the network system 100 may include communication ports configured to connect with a network, such as the network 104.

The network (e.g. the network 104) may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

The network connecting the devices described above (e.g. the network 104) may be a "content delivery network" or a "content distribution network" (CDN). A CDN generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

FIG. 2 is a diagram of a sparse matrix format of EAV data. In the sparse matrix format, each entity may be given a unique row in a database table, and each attribute a column. The values corresponding to an entity and attribute are then stored as the value of a record located at a particular column and row. The entities, attributes, and values shown in FIG. 2 are merely exemplary. In particular, FIG. 2 illustrates EAV data for four entities (labeled with identifier values 1-4). There are four attributes (color, size, shape, and type) shown in FIG. 2 that are stored in separate columns with the values shown in the matrix. The values for the color attribute are blue for entity ID 1, red for entity ID 2, and green for entity ID 3. The values for the size attribute are 2 for entity ID 1, 5 for entity ID 2, and 4 for entity ID 3. The values for the shape attribute are round for entity ID 1 and square for entity ID 2. The values for type are A for entity ID 1 and X for entity ID 4. Entities with no value for a particular attribute may merely have a null value. Typically, not all attributes may be associated with all entities. As a result, many columns of each row may have null values. In other words, where there is no value for a particular attribute/entity, there may be a null value. For large amounts of data and/or a large number of attributes, there may be a significant amount of wasted space (i.e. null values) in the sparse matrix. The low density of the sparse matrix format results in both less efficient use of storage space and slow responses to queries.

FIG. 3 is a diagram of direct translation of EAV data. In particular, the same exemplary EAV data from FIG. 2 is illustrated in FIG. 3. The direct translation of each unique EAV results in many rows in the database because each attribute for a given entity is repeated as another row. In other words, rather than having more columns for the attributes as in FIG. 2, FIG. 3 results in more rows for the attributes while maintaining one column each for entity, attribute, and value. The direct translation format may result in a more efficient use of disk space, but may have slower response time to queries, in part because the queries may be complex.

FIG. 4 is a diagram of one embodiment for dynamically indexing attributes. In particular, FIG. 4 illustrates an alternative storage mechanism that optimizes the trade-off of disk space storage and query response time. Initially, the attributes and respective values for any given entity are stored in serialized format within a single column. In one example, serialization of the attribute and value information may be in JavaScript Object Notation ("JSON") format or may be stored as a binary large object ("BLOB"). Each entity is assigned a particular row (as shown by each identifier/ID). All attribute and value information is stored in a single column, which includes the attribute and value information in serialized format. This may be a more efficient use of storage space and faster response time to queries for particular entity values, but may be slow for response time to queries for values of particular attributes. Accordingly, the database may be dynamically updated such that a particular attribute may be identified and indexed as its own column. Additional columns for such identified attributes may be referred to as dynamic columns, and those identified attributes may be referred to as indexed attributes.

The attributes that are identified/indexed within an additional column may be selected based on a number of non-null column values and/or based on query frequency. Indexes may be built and rebuilt both on a scheduled basis taking into account seasonal and geographic variations in sparse matrix density or query volume. Indexes may also be built/rebuilt based in response to a trigger, such as crossings of a threshold or band of change in query volume per unit time. For example, a number of queries for a particular attribute may be measured over a set time period and when that number exceeds a threshold number, then that particular attribute may be identified to become its own column. Attributes may be identified for a separate/dynamic column based on measuring query traffic over time, such as with the application of statistics (e.g. a histogram) of relative frequency of searching or query requests. That information may then be fed back to the indexer to identify the more popular attributes to be dynamically moved or copied to a separate column. The separate column can be indexed for quicker searching and retrieval of values related to that attribute. For example, if the most common query is based on shape, then that attribute is identified as discussed below with respect to FIG. 4.

FIG. 4 illustrates an example where the "shape" attribute is identified. As discussed above, that attribute may be identified based on a variety of factors. For example, shape may be queried frequently (more than a threshold amount) or may be predicted to be frequently accessed based on temporal, seasonal, or geographic variations. Accordingly, upon shape being identified as a dynamic attribute, a dynamic column is added to the EAV data such that the dynamic column includes the shape attribute and identifies attribute values for each entity identifier. Entities that do not have a particular attribute (e.g. ID 3 and 4) may have a null value in the dynamic column.

FIG. 5 is a diagram of another embodiment for dynamically indexing attributes. In particular, FIG. 5 illustrates the "type" attribute being identified/indexed in a dynamic column. The identification mechanism is discussed above. FIG. 5 illustrates that the dynamic column is added for the "type" attribute which may improve indexing and query response time for values of the type attribute. FIG. 5 illustrates an alternative to FIG. 4 in that the type attribute values are not removed from the serialized column and are merely copied to the dynamic column. FIG. 4 illustrated that the shape attribute values were removed from the serialized column upon being moved to the dynamic column.

FIG. 6 is a diagram illustrating the dynamic indexing of different attributes. The indexer 112 may monitor and track usage and queries of the EAV database 106. Based on the monitoring the EAV database may be dynamically updated such that additional dynamic columns are added (e.g. for active attributes) and other dynamic columns may be removed (e.g. for inactive attributes). The process is dynamic because the identified/indexed attributes that have their own column may change. This dynamic process optimizes query response time and performance. Although not required, FIG. 6 illustrates that those attributes that are moved to a dynamic column are removed from the serialized data column.

In particular, FIG. 6 illustrates that color is initially identified as a dynamic attribute and a separate column is added to the table. As discussed above, this identification may be based on query frequency (e.g. through analysis of query statistics, with one example being a histogram). Likewise, shape may be further identified as a relevant attribute that is separated. There may be individual indexes for these dynamic attributes (color/shape) or there may be a conjunctive index for the combination of these attributes (as discussed below) when compound queries for the combination of those two attributes are the more common or important queries. Finally, FIG. 6 illustrates a third identified attribute (size) that is included as a third dynamic column. Accordingly, the last table in FIG. 6 illustrates three identified/dynamic attributes. Each of those dynamic attributes may be indexed separately or together depending on the query frequency for those attributes.

As shown in FIG. 6, data is stored in a partially serialized format in a single table of a database that comprises 1) a column for an entity identifier (ID); 2) a column for serialized EAV information; and 3) one or more dynamic columns with attribute values for attributes identified as dynamic. Not all attributes may be provided as columns of the table. Certain columns may be frequently used for selection. These may be identified algorithmically either by calculation of the relative density of the attributes within a sparse matrix representation of the EAV information or by query volume relative to other attributes and values (e.g. number of selects within some window of time). In one embodiment, multiple columns pulled out may be for multiple and/or compound indexes on the table for query optimization.

Indexes may be built for one or more of the columns based on algorithmic logic and historical or real-time data about query volume. Algorithmic logic may operate to identify attributes for columns and indexes on a scheduled basis. Algorithmic logic may also be configured to accommodate known seasonal or geographical variations in query volume. Algorithmic logic may also provide for real-time updates to the columns and indexes of the database in response to triggers. For example, the building of an index on a particular attribute may be triggered when the change in the volume of queries per unit time exceeds a particular threshold and stays above that threshold for more than a day.

The addition of a dynamic column may be accompanied by the updating of the index for further indexing that additional column. The indexing may not be one-to-one with each column that is added. Using the example in FIG. 6, the statistics may first say that color is a common query term; then each of color and shape become independently common. That may lead to INDEX(color) and INDEX(shape). On the other hand, the statistics may identify a trend of a compound query with people inquiring about both color and shape. That may lead to INDEX(color, shape) or INDEX (shape, color). The algorithm may decide which of these indices is more optimal. If some queries involve only color and some involve both, then INDEX(color, shape) handles both sets of queries. If some queries involve only shape and some involve both then INDEX(shape, color) may be more optimal.

The dynamic updating may still maintain a single table for all the EAV data in which the columns include the searchable fields plus a BLOB. Searchable fields may be declared appropriately (INT, TIMESTAMP, etc). The BLOB may include JSON-encoding of all the extra fields, which is merely one example of serialization. The table may have the entity identifier (ID) as the PRIMARY KEY. There may be a small number of other indexes (maybe 'compound') on the searchable fields. Partitioning may not be of any use unless the entities should be purged after some time. (e.g. news articles). In addition, for MySQL implementations, serialized EAV information not indexed may be stored as BLOB by building the extra (or all) key-value pairs in a hash (associative array) within an application. An encoded and compressed version of the hash may be inserted as the BLOB. Compression can result a reduction to the amount of space of an uncompressed string. Upon queries, the BLOB is decompressed, and decoded back into a hash.

Conjunctive queries may be more common than single queries, so it may be more efficient to index for those conjunctive queries. For example, it may be more common for a user to query both color and shape rather than just querying either color or shape independently. The index may then be for the combination of color or shape. Accordingly, there may be two or more dynamic columns (e.g. color and shape as shown in FIG. 6) that are indexed together. This conjunctive index may be built to respond to conjunctive queries. In other words, an index for the combination of the color and shape columns would result in more efficient handling of conjunctive queries for the combination, which was determined to be the more popular queries. As discussed above, a statistics of queries may be used and analyzed to identify those queries that are relatively more popular, which is then used to identify attributes that can then be put into dynamic columns and indexed.

In one embodiment, a column may be migrated back into serialized form based on the statistics for the queries. In other words, if a particular column decreases in popularity, that column may be dynamically removed from being an additional column to being in serialized form.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A database for storing entity-attribute-value ("EAV") data, the database comprising:
   an identifier for each entity of the EAV data, wherein an entity includes a plurality of attributes that each have a value and the identifiers are stored in a first column;
   serialized data that includes both the attributes of the EAV data and the values of the EAV data, wherein each of the attributes is assigned to one of the values and corresponds to each of the identifiers, further wherein the serialized data is arranged in series, wherein the serialized data is stored in a second column; and
   one or more dynamic attributes from the EAV data that are indexed separately from the serialized data, wherein the one or more dynamic attributes comprise attributes that are removed from the serialized data and the one or more dynamic attributes are stored in different columns from the serialized data, wherein the different columns are dynamically added based on an analysis of statistics of queries for the dynamic attributes such that frequent queries for a particular attribute result in that particular attribute being identified as a dynamic attribute.

2. The database of claim 1 wherein the serialized data comprises one or more attributes and respective values stored together for each entity.

3. The database of claim 1 wherein the one or more dynamic attributes are copied from the serialized data column.

4. The database of claim 1 wherein the one or more dynamic attributes are moved from the serialized data column such that the one or more dynamic attributes are not present with the serialized data.

5. The database of claim 1 wherein the different columns are dynamically added based on seasonal or temporal changes to queries for the dynamic attributes.

6. A computerized method with a database that optimizes entity-attribute-value ("EAV") data, the method comprising:
   monitoring queries to a database that includes the EAV data in a serialized data format in a single column that includes both attributes of the EAV data and values of the EAV data, wherein each of the attributes is associated with one of the values and the serialized data format comprises serial data;
   identifying attributes from those queries that are queried frequently;
   indexing the identified attributes in a dynamic column that is added to the EAV data and is different from the single column and that includes the identified attribute, wherein the attributes that are not indexed with the dynamic column are maintained in the serialized data format and are not in the dynamic column, further wherein the identified attributes indexed in the dynamic column comprise dynamic attributes stored in the dynamic column that are dynamically added based on an analysis of statistics of queries for the dynamic attributes such that frequent queries for a particular attribute result in that particular attribute being identified as a dynamic attribute; and iteratively monitoring and indexing the identified attributes based on the queries to the database.

7. The method of claim 6 wherein the attributes that are not indexed are stored in a serialized data format in the single column.

8. The method of claim 6 wherein the identification of attributes that are queried frequently is determined when a number of queries of the identified attribute exceeds a threshold number of queries.

9. The method of claim 6 wherein the identification of attributes is based on seasonal or temporal predictions for changes in the queries to the database.

10. A computer system comprising:
    a database storing entity-attribute-value ("EAV") type data, the database comprising:
      a first column storing identifiers for each entity from the EAV type data;
      a second column storing one or more attributes and respective values for those attributes from the EAV type data, wherein the second column utilizes a serialized format; and
    a dynamic column, different from the first column and the second column, that is added for an identified attribute and that includes respective values for the identified attribute; and
    a processor coupled with the database for dynamically identifying attributes to be stored in the dynamic column, wherein the identified attributes to be stored in the dynamic column are dynamic attributes that are dynamically added based on an analysis of statistics of queries for the dynamic attributes such that frequent queries for a particular attribute result in that particular attribute being identified as a dynamic attribute, further wherein the dynamic attributes are indexed separately from the EAV data in the serialized format and the dynamic attributes comprise attributes that are removed from the second column.

11. The computer system of claim 10 wherein database comprises additional dynamic columns that correspond to additional identified attributes.

12. The computer system of claim 11 wherein each of the identified attributes that is stored in a dynamic column is indexed for a quicker response to queries for values corresponding to the identified attributes.

13. The computer system of claim 12 wherein each of the identified attributes is stored in a separate dynamic column and multiple dynamic columns are indexed together.

14. The computer system of claim 11 wherein the dynamic identifying of attributes is based on monitoring of queries to the database, such that the identified attribute is dynamically identified when it is queried more than a threshold number of queries.

15. The computer system of claim 10 wherein the identified attribute is dynamically identified based on seasonal or temporal predictions for changes in queries to the database.

16. The computer system of claim 10 wherein the identified attribute is indexed differently when in the dynamic column than when stored in the serialized format in the second column.

\* \* \* \* \*